(12) United States Patent
Otsuka et al.

(10) Patent No.: US 11,182,435 B2
(45) Date of Patent: Nov. 23, 2021

(54) MODEL GENERATION DEVICE, TEXT SEARCH DEVICE, MODEL GENERATION METHOD, TEXT SEARCH METHOD, DATA STRUCTURE, AND PROGRAM

(71) Applicant: NIPPON TELEGRAPH AND TELEPHONE CORPORATION, Chiyoda-ku (JP)

(72) Inventors: Atsushi Otsuka, Yokosuka (JP); Katsuji Bessho, Yokosuka (JP); Kyosuke Nishida, Yokosuka (JP); Hisako Asano, Yokosuka (JP); Yoshihiro Matsuo, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 183 days.

(21) Appl. No.: 16/461,201

(22) PCT Filed: Nov. 20, 2017

(86) PCT No.: PCT/JP2017/041630
§ 371 (c)(1),
(2) Date: May 15, 2019

(87) PCT Pub. No.: WO2018/097091
PCT Pub. Date: May 31, 2018

(65) Prior Publication Data
US 2019/0278812 A1    Sep. 12, 2019

(30) Foreign Application Priority Data

Nov. 25, 2016   (JP) .............................. JP2016-229072

(51) Int. Cl.
*G06F 16/30* (2019.01)
*G06F 16/903* (2019.01)
(Continued)

(52) U.S. Cl.
CPC ........ *G06F 16/90344* (2019.01); *G06F 16/00* (2019.01); *G06F 16/90332* (2019.01); *G06N 3/04* (2013.01)

(58) Field of Classification Search
CPC ............ G06F 16/3329; G06F 16/3338; G06F 16/90344; G06F 16/3334
(Continued)

(56) References Cited

U.S. PATENT DOCUMENTS

2004/0158560 A1* 8/2004 Wen ..................... G06F 16/3338
2007/0022099 A1* 1/2007 Yoshimura .......... G06F 16/3329
(Continued)

FOREIGN PATENT DOCUMENTS

JP    2000-339314 A    12/2000
JP    2007-304793 A    11/2007
(Continued)

OTHER PUBLICATIONS

International Search Report dated Feb. 20, 2018 in PCT/JP2017/041630 filed on Nov. 20, 2017.
(Continued)

*Primary Examiner* — Sana A Al-Hashemi
(74) *Attorney, Agent, or Firm* — Oblon, McClelland, Maier & Neustadt, L.L.P.

(57) ABSTRACT

Taking as input a group of text pairs for learning in which each pair is constituted with a first text for learning and a second text for learning that serves as an answer when a question is made with the first text for learning, a query expansion model is learned so as to generate a text serving as an expanded query for a text serving as a query.

12 Claims, 8 Drawing Sheets

(51) Int. Cl.
*G06F 16/9032* (2019.01)
*G06N 3/04* (2006.01)
*G06F 16/00* (2019.01)

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 2010/0010803 A1* | 1/2010 | Ishikawa | G06F 40/247 704/9 |
| 2013/0060769 A1* | 3/2013 | Pereg | G06F 16/3338 707/728 |
| 2016/0147775 A1 | 5/2016 | Nauze et al. | |
| 2016/0179945 A1* | 6/2016 | Lastra Diaz | G06F 16/3334 707/739 |
| 2019/0278812 A1* | 9/2019 | Otsuka | G06N 3/0454 |

FOREIGN PATENT DOCUMENTS

| | | |
|---|---|---|
| JP | 2011-103018 A | 5/2011 |
| JP | 2014-99062 A | 5/2014 |
| JP | 2016-66232 A | 4/2016 |

OTHER PUBLICATIONS

Sutskever, I. et al., "Sequence to Sequence Learning with Neural Networks," 2013, pp. 1-9.

Luong, M-T. et al., "Effective Approaches to Attention-based Neural Machine Translation," Proceedings of the 2015 Conference on Empirical Methods in Natural Language Processing, 2015, pp. 1412-1421.

* cited by examiner

| TEXT ID | KEYWORD | WEIGHT |
|---------|---------|--------|
| 01A | BANDWIDTH LIMITING | 2.51 |
| 01A | SPEED | 1.22 |
| 01A | TERMS OF USE | 3.43 |
| 01B | AGREEMENT | 1.82 |

…

MODEL GENERATION DEVICE, TEXT SEARCH DEVICE, MODEL GENERATION METHOD, TEXT SEARCH METHOD, DATA STRUCTURE, AND PROGRAM

TECHNICAL FIELD

The present invention relates to a model generation device that learns a query expansion model for expanding a voice or text input for a search, a text search device that searches for an input voice or text, a model generation method of learning a query expansion model for expanding a voice or text input for a search, a text search method of searching for an input voice or text, and a program for expanding a voice or text input for a search and learning a query expansion model, or a program for searching for an input voice or text.

BACKGROUND ART

In an information search system, a search is performed for a text that matches a set of search keywords (a query) input by the user, by a process such as keyword matching or the like with respect to the query. In the case of a search by keyword matching, there has been a problem that a keyword input as a query needs to perfectly match a keyword in a text, and hence, the recall of the search decreases. Thereupon, query expansion has become available as a technology that automatically increases keywords included in a query to enable matching with a wider variety of documents. In query expansion, a keyword to be expanded is determined by statistical processing on search logs.

Applications of information search include question answering (FAQ search), interactive processing, and the like. These systems aim at returning a reasonable response to a question or remark of the user. In such a question answering system or interactive system, a problem to be solved is to select the most appropriate candidate by an information search approach with respect to an input of the user from a database that stores in advance a large number of FAQs, response candidate sentences, and the like. In a response sentence search, pairs of questions and responses are stored in a database to compare an input of the user with the questions, so as to output a response sentence of the question having the highest similarity. This enables to respond appropriately to questions, utterances, and the like of the user.

RELATED ART DOCUMENTS

Patent Documents

Patent Document 1: Japanese Unexamined Patent Publication No. 2014-99062
Patent Document 2: Japanese Unexamined Patent Publication No. 2011-103018

SUMMARY OF INVENTION

Problem to be Solved by the Invention

In a FAQ search, an interactive system, and the like, pairs of two texts such as Q's (Questions) and A's (Answers), or utterance sentences and corresponding response sentences are stored in a database, and in an actual search, the first texts of the pairs such as Q's and utterance sentences are mainly used to be compared with an actual input query. In this case, it is often the case that the second texts such as A's and response sentences are not used in the search.

However, there is a case where relevance is not determined with comparison only between an input query and the first texts, and comparing the input query with the second texts clarifies the relevance.

For example, assume that when a question "this movie is too heavy to watch" is input as an input query in a FAQ search, it is desired to find an answer "there may be a case where the communication speed decreases due to bandwidth limiting when the communication traffic volume is large". This pair is highly likely to be valid as relevant Q and A because bandwidth limiting due to the movie being overly viewed may be considered as one of the reasons why the movie cannot be watched.

However, in actual FAQs, there are few Qs described with reference to a rather specific event such as "this movie is too heavy to watch"; rather, in quite a few cases, it is described with a generalized content such as "please tell me about bandwidth limiting". At this time, "this movie is too heavy to watch" and "please tell me about bandwidth limiting" have a low similarity in a normal search, and it is highly likely that the search fails.

If sufficient search results cannot be obtained by performing the search with an input query and the first texts, it is possible to use the input query and the second texts such as A's of the FAQ in the search. However, since the keywords included in the input query are different from the keywords used in the second texts, even if the searched is performed by directly using the keywords included in the input query, it is often the case that an appropriate search result cannot be obtained, and sufficient search accuracy cannot be obtained.

At that time, it is also possible to execute expanding the keywords included in the input query by using a technique such as query expansion and the like, and methods of query expansion using search logs and the like have been used conventionally. However, since the conventional method expands a keyword based on the semantic similarity of keywords, it is often the case that even if keyword expansion is performed, keywords suitable for searching in the second texts cannot be generated.

For example, in the example described above, when expanding the keyword "movie", in many cases, keywords such as "video", "viewing", and the like having high semantic similarity to "movie" are generated, whereas keywords such as "communication traffic volume", "bandwidth limiting", and the like are rarely generated.

As such, even when keyword expansion is performed on keywords included in an input query, since appropriate keywords are not generated by the keyword expansion, it has not been possible to obtain an accurate search result for the input query.

The present invention has been made in view of the above circumstances, and has an object to provide a model generation device, a text search device, a model generation method, a text search method, a data structure, and a program that enable to accurately obtain a search result as a pair of texts with respect to an input query.

Means for Solving the Problem

In order to achieve the above object, a model generation device of the present invention includes a model learning unit configured to take as input a group of text pairs for learning in which each pair is constituted with a first text for learning and a second text for learning that serves as an answer when a question is made with the first text for learning, so as to learn a query expansion model that generates a text serving as an expanded query for a text serving as a query.

Note that the model generation device may further includes a search index generator configured, based on a group of text pairs to be searched in which each pair is constituted with a first text to be searched and a second text to be searched that serves as an answer when a question is made with the first text to be searched, to generate a search index for the first texts to be searched and a search index for the second texts to be searched.

Also, the model generation device may further include a word filter configured to use a word list of texts to be searched that is constituted with words included in a group of text pairs to be searched in which each pair is constituted with a first text to be searched and a second text to be searched that serves as an answer when a question is made with the first text to be searched, so as to remove words not included in the word list of texts to be searched from the group of text pairs for learning, wherein the model learning unit learns the query expansion model, based on the group of text pairs for learning in which the words that are not included in the word list of texts to be searched have been removed by the word filter.

In order to achieve the above object, a text search device of the present invention searches for a pair of first text and second text that corresponds to an input query, from among a group of text pairs to be searched in which each pair is constituted with a first text to be searched and a second text to be searched that serves as an answer when a question is made with the first text to be searched. The text search device includes an expanded query generator configured to generate an expanded query for searching in the second texts based on a query expansion model for generating the expanded query with respect to the input query; and a text pair searcher configured to search for the pair of first text and second text based on the input query and the expanded query.

Note that the text pair searcher may search for the pair of first text and second text, based on a search index for the first texts, the input query, a search index for the second texts, and the expanded query.

Also, the text pair searcher may include a first text search score calculator configured to calculate a first text search score for each of the first texts based on the search index for the first texts and the input query; a second text search score calculator configured to calculate a second text search score for each of the second texts based on the search index for the second texts and the expanded query; and an output unit of a search score integration result configured, for each pair of the first text and the second text, to integrate the first text search score and the second text search score so as to search for the pair of first text and second text.

In order to achieve the above object, a data structure of the present invention is used in a text search device that searches for a pair of first text and second text that corresponds to an input query, from among a group of text pairs to be searched in which each pair is constituted with a first text to be searched and a second text to be searched that serves as an answer when a question is made with the first text to be searched. The data structure includes a query expansion model that takes as input a group of text pairs for learning in which each pair is constituted with a first text for learning and a second text for learning that serves as an answer when a question is made with the first text for learning, so as to generate a text serving as an expanded query for a text serving as a query; a search index for the first texts to be searched; and a search index for the second texts to be searched.

In order to achieve the above object, a model generation method of the present invention in a model generation device including a model learning unit, includes a step of causing the model learning unit to take as input a group of text pairs for learning in which each pair is constituted with a first text for learning and a second text for learning that serves as an answer when a question is made with the first text for learning, so as to learn a query expansion model that generates a text serving as an expanded query for a text serving as a query.

In order to achieve the above object, a text search method of the present invention is executed in a text search device including an expanded query generator and a text pair searcher, to search for a pair of first text and second text that corresponds to an input query, from among a group of text pairs to be searched in which each pair is constituted with a first text to be searched and a second text to be searched that serves as an answer when a question is made with the first text to be searched. The text search method includes a step of causing the expanded query generator to generate an expanded query for searching in the second texts based on a query expansion model for generating the expanded query for the input query; and a step of causing the text pair searcher to search for the pair of first text and second text based on the input query and the expanded query.

In order to achieve the above object, a program of the present invention is a program for causing a computer to function as units of the model generation device or the text search device.

Advantage of the Invention

According to the present invention, it is possible to obtain a search result of a pair of texts with respect to an input query with high accuracy.

EMBODIMENTS OF THE INVENTION

In the following, embodiments of the present invention will be described with reference to the drawings.

A search system according to the present embodiment includes a model generation device that learns a model for searching and a text search device that executes searching.

Figure 1:
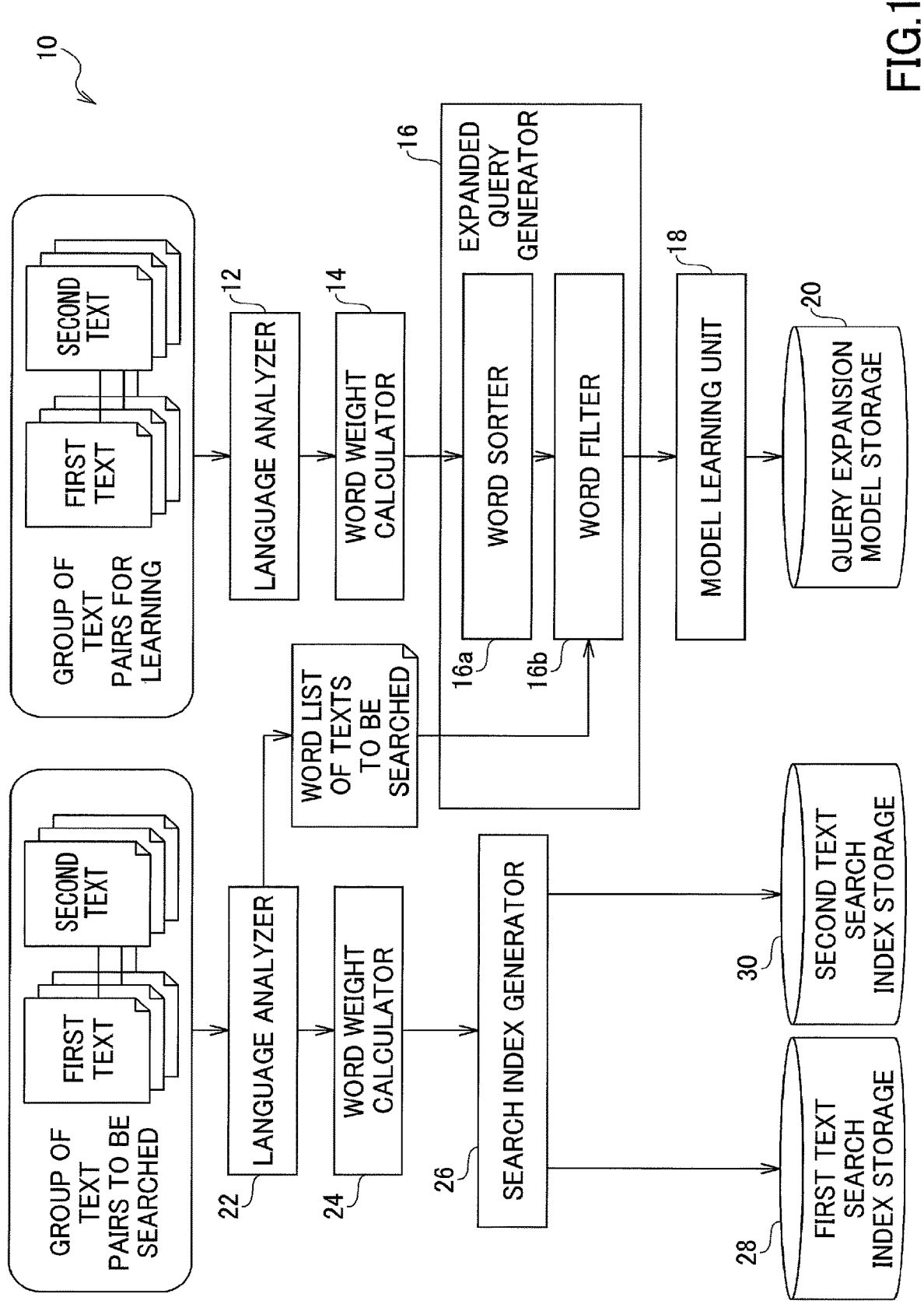
FIG. 1 is a functional block diagram illustrating a configuration of a model generation device according to an embodiment.
Figure 2:
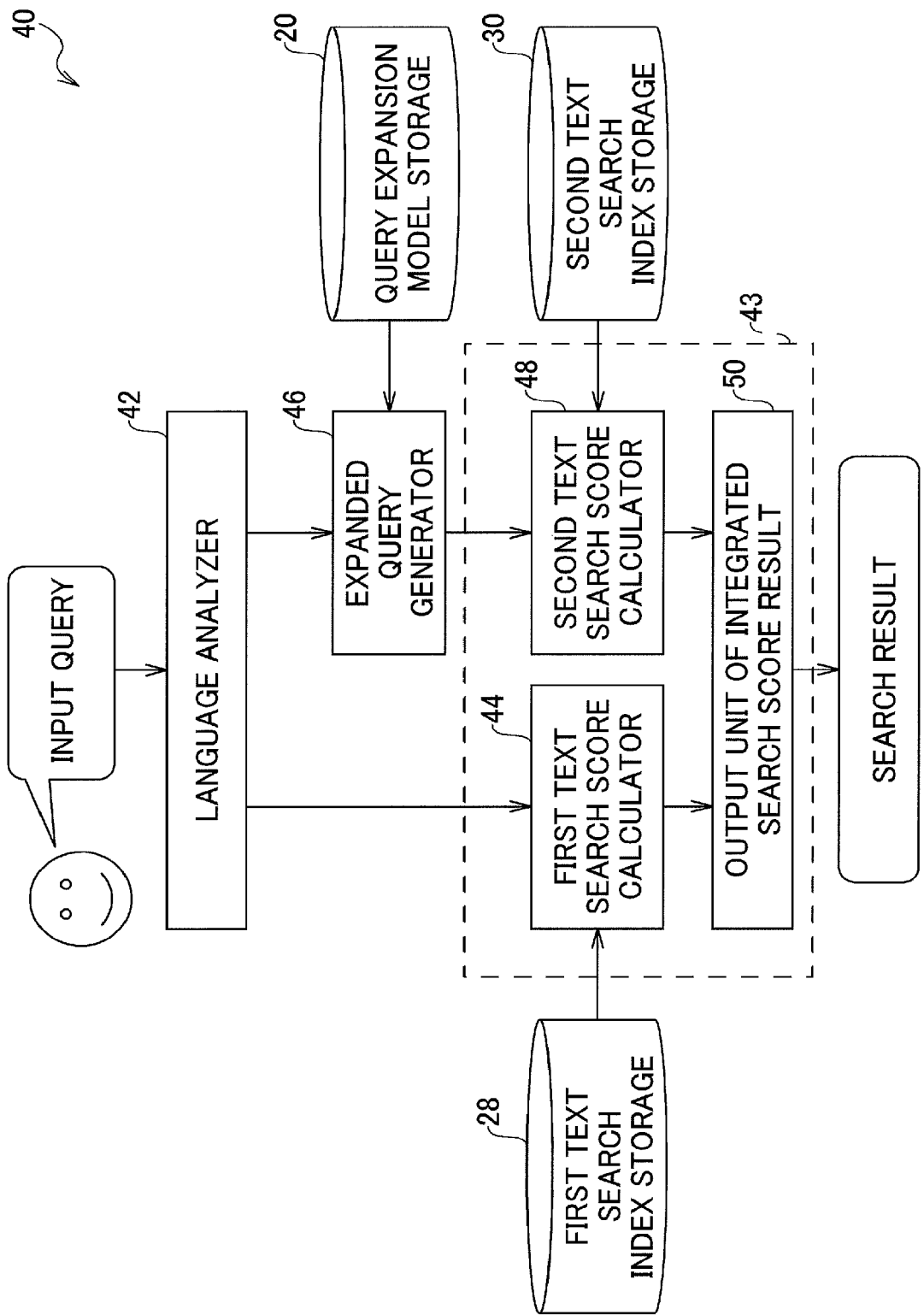
FIG. 2 is a functional block diagram illustrating a configuration of a text search device according to an embodiment.

FIG. 1 is a block diagram illustrating a configuration of a model generation device 10. Also, FIG. 2 is a block diagram illustrating a configuration of a text search device 40. First, the model generation device 10 will be described, and next, the text search device 40 will be described.

The model generation device 10 takes as input a group of text pairs for learning in which each pair is constituted with a first text for learning, and a second text for learning that serves as an answer when a question is made with the first text for learning, to generate a query expansion model for expanding an input query. The model generation device 10 also takes as input a group of text pairs to be searched in which each pair is constituted with a first text to be searched, and a second text to be searched that serves as an answer when a question is made with the first text to be searched, to generate a first text search index and a second text search index.

In the present embodiment, when a group of text pairs for learning and a group of text pairs to be searched are input, for the group of text pairs for learning and the group of text pairs to be searched, morphological analysis is first performed by a language analyzer 12 and a language analyzer 22, which will be described later, and input keyword extraction is performed. Next, a weight is calculated for each word appearing in the group of text pairs for learning and the group of text pairs to be searched. Here, as done in a normal full-text search engine, an inverted index using the above weights is generated. Also, shaping is performed for the group of text pairs for learning so as to input the group into a query expansion model using a neural network. Then, a query expansion model for generating an expanded query for searching in the second texts for learning by using the neural network is learned.

In the present embodiment, a corpus for learning is used as a group of text pairs for learning, which has a larger scale than a group of text pairs to be searched. For example, a corpus of a question answering site on the Web is used. A question answering site is a service in which when a user submits a question sentence by a natural-language sentence, another user can post an answer sentence with respect to the question sentence. In the present embodiment, a group of text pairs for learning is generated by using question texts as the first texts for learning and answer sentences as the second texts for learning, to be used as a corpus for learning.

Also, in the present embodiment, when learning a query expansion model, words that appear in the query expansion model are limited to words included in a word list of texts to be searched which is generated by listing words included in a group of text pairs to be searched. This enables to perform learning of the query expansion model efficiently and at high speed.

However, when the model generation device according to the present embodiment is used in a device other than the text search device 40, it is unnecessary to limit the words to appear in the query expansion model by using the word list of texts to be searched.

As illustrated in FIG. 1, the model generation device 10 includes a language analyzer 12, a word weight calculator 14, an expanded query generator 16, a model learning unit 18, a query expansion model storage 20, a language analyzer 22, a word weight calculator 24, a search index generator 26, a first text search index storage 28, and a second text search index storage 30.

In the following, each processing unit will be described in detail.

The language analyzer 12 and the language analyzer 22 apply language processing to a group of text pairs for learning and a group of text pairs to be searched, to perform keyword extraction. At this time, in the case where each group of text pairs is described without word delimiters as in Japanese, morphological analysis is applied to the texts to be divided into units of words, whereas in the case where each group of text pairs is described in a language including obvious word delimiters as in English, the sentences are separated into units of words according to the word delimiters. Note that at this time, the language analyzer 12 and the language analyzer 22 also perform stemming of words.

The language analyzer 12 and the language analyzer 22 extract only words that are content words such as nouns and verbs from among the delimited words, to set the extracted words as keywords used in a search. Note that at this time, in the case where multiple consecutive words represent one proper noun, processing such as joining these multiple words may be performed.

Note that the language analyzer 22 lists the keywords extracted from among the group of text pairs to be searched, to store them as a word list of texts to be searched. The word list of texts to be searched is used when filtering words by the word filter 16b.

The word weight calculator 14 and the word weight calculator 24 calculate weights representing degrees of importance of the extracted keywords, to be used for generation of a search index by the search index generator 26, which will be described later, and for sorting words by the word sorter 16a, which will be described later. In weight calculation, IDF values often used in information search are used. The IDF value IDF(w) of a word w is calculated by the following Formula (1). Here, df(w) in the following (1) is the number of texts in which the word w appears, and N is the total number of texts.

$$idf(w) = \log \frac{N}{df(w)} \quad (1)$$

Note that a modified formula other than the above, such as Okapi BM25, may be used as long as being a calculation formula having the same properties as the IDF value.

Figure 3:
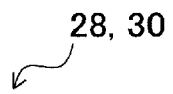
FIG. 3 is a schematic diagram illustrating an example of a search index according to the present embodiment.

The search index generator 26 generates a search index for searching in a group of text pairs to be searched. As illustrated in FIG. 3, the search index is a database in which for each combination of a text ID and a word, items of the text ID, a keyword, and a weight of the keyword are associated with each other to be stored. In this case, the weight is calculated by TF/IDF by using the IDF value calculated by the word weight calculator 24. The weight of a word w of a text d to be used as a keyword is expressed by the following Formula (2). Here, tf(d, w) in the following Formula (2) is the number of times the word w appears in the text d.

$$\text{weight}(d,w) = tf(d,w) \times idf(w) \quad (2)$$

Note that other than TF/IDF used for calculating the weight, a weight may be calculated by using another weight calculation method such as Okapi BM25.

The expanded query generator 16 includes the word sorter 16a and the word filter 16b.

The word sorter 16a sorts words for each of which the weight has been calculated, according to the weights. In an encoder-decoder model using a neural network, in an output phase, a series of words and characters are output. In a general translation model, learning is performed so as to be capable of outputting characters and words in a grammatically correct order. However, in the present embodiment, since words output by a query expansion model are used as a search query, grammatical arrangement is unnecessary.

Thereupon, in the present embodiment, in order to effectively utilize words output by a query expansion model in a search, words are output in an order according to the importance of words. In order to output words in an order of importance, the words appearing in a group of text pairs for learning simply need to be sorted so that an arrangement in an order of appearance after morphological analysis and word delimiting is changed so as to have more important words come closer to the head.

The importance of words can be calculated by TF/IDF as in the process executed by the search index generator 26 described above. For example, suppose that a sentence "there may be a case where the communication speed decreases due to bandwidth limiting when the communication traffic volume is large" is morphologically analyzed and arranged, the words may be arranged such that "be case communication-speed decrease bandwidth-limiting communication-traffic-volume large"; then, by sorting these words in an order of the weights of the words, the word order may become "bandwidth-limiting communication-speed communication-traffic-volume decrease case large be". Sorting the words in this way enables, when performing query expansion, to prioritize more important words to be output in the output phase.

In the present embodiment, since word sequence data is output in a decoding phase, the word sorter 16a surely performs sorting of words as described above for the second texts for learning to be output as learning data. In contrast, in an input phase, since encoding is performed without considering the word order of words in sequence data of words, the word sorter 16a does not necessarily need to perform sorting of words as described above for the first texts for learning.

However, in the case of limiting the number of words or the like to be input as a first text for learning, if limiting is done by cutting at the n-th character from the head, for example, in Japanese, words that tend to appear at the head of a sentence such as subjects including "watashi" ("I" in English), are always learned, whereas important words that tend to appear in the second half of a sentence, such as predicates, are likely not to be learned. Therefore, in the present embodiment, in order to use more important words for learning, sorting of words is similarly performed for the first texts for learning as for the second texts for learning. This enables to always use words that are effective for learning by learning.

The word filter 16b generates a search query for searching in the second texts for learning by using, for example, an encoder-decoder model. In a group of text pairs for learning, various descriptions are made in a large amount of texts. If learning is performed with the encoder-decoder model by using such a group of text pairs for learning as it is, various words are output in a decoding phase. However, considering that the output words are used in a search, it is useless to generate words that do not appear in the group of text pairs to be searched because these words will not be hit and will not be used even if a larger number of these words are generated. Thereupon, by limiting the vocabulary of words output in a decoding phase to a range of vocabulary included in the group of text pairs to be searched, it becomes possible to perform learning efficiently and at high speed.

The word filter 16b collates the word list of texts to be searched obtained by the language analyzer 22 with the group of text pairs for learning in which the words are sorted by the word sorter 16a, to remove words that do not exist in the word list of texts to be searched from the sorted group of text pairs for learning. This is a process performed only on the second texts for learning on the output side. Regarding the first texts for learning, in order to receive various inputs, the words are not filtered.

Note that when learning a query expansion model, in the case where a group of text pairs to be searched cannot be obtained, such as a case where a group of text pairs to be searched is not determined, filtering of words with the word list of the text to be searched by the word filter 16b may be skipped, to learn a general-purpose query expansion model.

The model learning unit 18 learns a model for converting input into output. In the present embodiment, an encoder-decoder model is used as this model. The encoder-decoder model is a model that can learn conversion between input and output by using a neural network, in which learning on the neural network simply needs to input pairs of first texts and second texts included in a group of the text pairs for learning as they are; the encoder-decoder model has a feature that learning parameters are automatically learned by using the neural network.

For example, as described in the following Reference 1, when learning is performed with a (Japanese) sentence "watashi wa tenisu ga shitai" as input and "I want to play tennis" as output, an automatic translator may be generated by simply inputting a group of text pairs for learning.

[Reference 1] Ilya Sutskever, Oriol Vinyals, Quoc V. Le, "Sequence to Sequence Learning with Neural Networks", 2013

The encoder-decoder model is constituted with an encoder that converts an input character string to a feature vector, and a decoder that generates an output character string from the feature vector converted by the encoder.

In a general encoder-decoder model, although both an encoder and a decoder are configured by using a neural network called LSTM that uses an activation function robust in handling a sequence structure, in the present embodiment, a neural network that uses a normal active function such as a sigmoid function is used in the encoder. This is because when considering a search, an input query may be a set of keywords or a natural-language sentence; when the format of an input query is indefinite as such, it is not appropriate to use a sequence model such as LSTM, which is likely to be greatly influenced by the order of words; therefore, in the present embodiment, the encoder-decoder model does not use the sequence model for the encoder.

Figure 4:
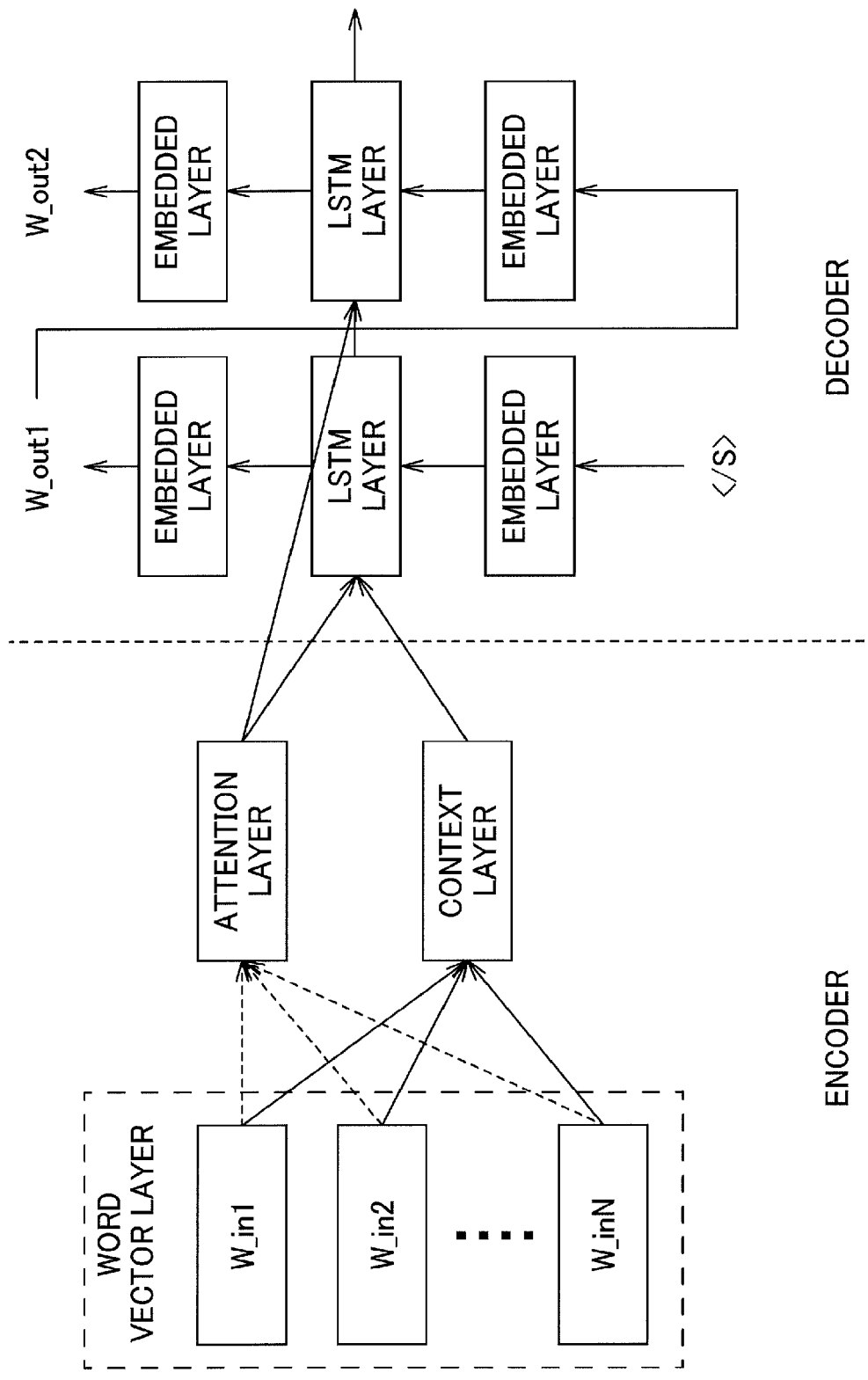
FIG. 4 is an explanatory diagram for describing a neural network according to an embodiment.

FIG. 4 illustrates the encoder-decoder model used in the present embodiment. As illustrated in FIG. 4, the encoder is constituted with word vector layers of W_in1 to W_inN, a context layer, and an attention layer. Also, the decoder is constituted with embedded layers and LSTM layers that occupy a feature vector representing the meaning of a word. Note that </S> input into the decoder means the head of a sentence.

In the word vector layer, a vector obtained by converting words into a vector representation is used. As such a vector, a one-hot type vector in which a corresponding element (word) is set to 1 and the other elements (words) are set to 0; a word vector learned in advance by Word2vec (registered trademark); or the like may be used.

The context layer takes as input the total sum of the sum vectors of all word vectors. Also, although the attention layer determines the output by performing substantially the same calculation as in "global attention" described in the following Reference 2, since a hidden layer of LSTM does not exist in the encoder of the present embodiment, the output of the word vector is treated as output of a hidden layer.

[Reference 2] Minh-Thang Luong, Hieu Pham, Christopher D. Manning, "Effective Approaches to Attention-based Neural Machine Translation", 2015

The decoder is an LSTM-based generation model as in the above References 1 and 2. In this case, the number of units of the layers of the neural network, an optimization method of learning, and a method of setting an error function are not particularly specified in the present embodiment, and can be set appropriately in consideration of the scale of a group of text pairs for learning, the language to be used, and the like in an application. Also, the neural network model presented in the present embodiment has a minimum configuration, which may be modified such that each layer of the neural network such as the context layer or the like may be converted into a multistage layer.

The model learning unit 18 stores a learned query expansion model in the query expansion model storage 20.

The search index generator 26 uses a group of text pairs to be searched to generate two types of indices, which are a first text search index for searching in the first texts to be searched, and a second text search index for searching in the second texts to be searched. At this time, the search index generator 26 generates a first text search index only from the first texts to be searched. When generating the second text search index, the search index generator 26 may generate a second text search index only from the second texts to be searched, or may generate a second text search index from texts in which the first texts to be searched and the second texts to be searched are combined together.

The search index generator 26 stores the generated first text search index in the first text search index storage 28. Also, the search index generator 26 stores the generated second text search index in the second text search index storage 30.

In this way, the first index search index and the second text search index are generated from the group of text pairs to be searched by the search index generator 26, and a query expansion model is learned by the model learning unit 18 from the group of pairs for learning, for searching in the second texts.

Here, in the conventional information search technology, the first texts and the second texts are combined to be considered as one document to perform searching. In contrast, the text search device 40 according to the present embodiment is characterized in that searches are performed separately with different queries for searching in the first texts and for searching in the second texts.

The text search device 40 searches for a pair of first text to be searched and second text to be searched that correspond to an input query from among the group of text pairs to be searched in which each pair is constituted with a first text to be searched, and a second text to be searched that serves as an answer when a question is made with the first text to be searched. At this time, with respect to the input query, the text search device 40 generates an expanded query for searching in the second texts to be searched, based on a query expansion model learned in advance for generating the expanded query. Also, based on the input query and the expanded query, the text search device 40 searches for a pair of first text to be searched and second text to be searched.

As illustrated in FIG. 2, the text search device 40 is configured to include a language analyzer 42, a text pair searcher 43, and an expanded query generator 46. Also, the text pair searcher 43 includes a first text search score calculator 44, a second text search score calculator 48, and an output unit of integrated search score result 50.

In the following, each processing unit will be described in detail.

The language analyzer 42 performs substantially the same processing as the language analyzers 12 and 22 of the model generation device 10.

The first text search score calculator 44 calculates a search score as a comparison result obtained by comparing an input query with the first texts of the group of text pairs to be searched. When calculating the first text search score, the first text search index generated by the model generation device 10 and stored in the first text search index storage 28 is used.

The first text search score can be calculated by the total sum of the weights stored in the first text search index. The first text search score $score_1$ of a first text d and an input query Q is expressed by the following Formula (3). Here, q in the following Formula (3) represents a keyword included in the input query Q; and weight(d1, q) is a weight value representing the weight of a text d and the word q stored in the first text search index.

$$\text{score}_1(d_1, Q) = \sum_{q \in Q} \text{weight}(d_1, q) \tag{3}$$

According to the above Formula (3), a first text that has a greater number of matches with the input query with respect to important keywords has a higher value of the first text search score. Since the calculation of the first text search score is to perform a general keyword matching search, it can be combined with a query expansion using semantic similarity of words, a score calculation method using meaning vectors of words, and the like, to be used.

The expanded query generator 46 inputs an input query into a query expansion model stored in the query expansion model storage 20, to perform keyword expansion so as to generate an expanded query for the second text search. Note that the keywords extracted by the language analyzer 42 may be directly input into the query expansion model. However, when the input query is a long sentence, as in the case of the word sorter 16a of the model generation device 10, the weights of the words may be calculated in advance, to extract the top n words having greater weight values based on the weights of the words, so as to input these words into the query expansion model. Note that n is set in advance by the user or the like. It is favorable to set n, for example, to a single digit to several tens of words.

In the query expansion model, 0 to N keywords are dynamically output. At this time, all of the output N keywords may be used for the expanded query, or if the number of outputs is large, up to n-th output keyword may be used where n can be set discretionarily. Since a query expansion model is learned so as to output keywords in an order of the importance in a search in an output phase; therefore, when limiting the number of expanded keywords, the expanded keywords may be used in accordance with the order output by the query expansion model.

Note that when calculating the second text search score, a group of keywords obtained by adding the expanded group of keywords output by the expanded query generator 46 to the group of keywords of the input query is used as an expanded query.

The second text search score calculator 48 uses the expanded query generated by the expanded query generator 46, and the second text search index generated by the search index generator 26 of the model generation device 10 and stored in the second text search index storage 30, to calculate the second text search score.

When calculating the second text search score, the proximity weight is taken into account in addition to Formula (3) used for calculating the first text search score. The proximity weight is an index to indicate, when a keyword in the expanded query hits a keyword in a second text, how close other hit keywords exist in the second text.

It is often the case that a second text is described as a longer sentence(s) than a first text. Also, if hit keywords densely appear in a fewer number of sentences as a second text, likelihood is high that more useful information is obtained than in the case where hit keywords sparsely appear over a greater number of sentences. Therefore, in a search in a second text, the proximity weight indicating the proximity of the positions between hit keywords is introduced.

The proximity weight is calculated by averaging distances between hit keywords. Denoting a second text by d, the proximity weight when a word q is hit is calculated according to the following Formula (4). Here, H in the following Formula (4) represents a set of keywords of the input query hit with the second text d; $N_H$ represents the total number of keywords in the set of keywords; and L represents the position of a keyword from the head of the second text d.

$$prox(d_2, q) = \frac{1}{N_H} \sqrt{\sum_{h \in H} (L(d_2, q) - L(d_2, h))^2} \quad (4)$$

For example, assume that there is a second text d "large-communication-traffic-volume bandwidth-limiting communication-speed decrease case be". In this case, L(d2, bandwidth-limiting)=3, and L(d2, decrease)=5. By using the proximity weight in this way, the second text search score is calculated according to the following Formula (5).

$$score_2(d_2, Q) = \sum_{q \in Q} weight(d_2, q) \times prox'(d_2, q) \quad (5)$$

Here, prox'(d2, q) in the above Formula (5) represents a proximity weight value normalized between 0 and 1. Since the proximity weight is calculated based on the distances between keywords, the range of values is indefinite. For this reason, it is necessary to normalize so that the value is limited within the range between 0 and 1 in order to use it as the weighting factor. As for the normalization method, any normalization method such as one using a sigmoid function may be used. Also, when the second text is not a long sentence, a calculation formula similar to that used for the first text search score may be used instead of the search score calculation method introducing the proximity calculation.

The output unit of integrated search score result 50 integrates a first text search score and a second text search score, to calculate an integrated score so as to output a search result in descending order of the integrated scores. In the present embodiment, an integrated score is calculated as a linear sum of a first text search score and a second text search score. With respect to an input query Q, for a pair of text PD of a first text $d_1$ and a second text $d_2$ in a group of text pairs, the integrated score is calculated according to the following Formula (6). Here, $w_1$ and $w_2$ in the following Formula (6) are weighting factors for the linear sum.

$$score(PD,Q) = w_1 \times score(d_1, Q) + w_2 \times score(d_2, Q) \quad (6)$$

The ratio of consideration between the first text and the second text differs depending on the group of text pairs to be searched. For example, in a FAQ search, when the content of a question is clearly described in the part corresponding to the input query Q, the search should be performed by giving a greater consideration for the first text Q. On the other hand, when the input query Q only includes a brief description such as "about something", and the answer as the second text includes abundant descriptions, a better result would be obtained by giving priority to the second text search score of the answer as the second text. Also, the weighting factor may be given manually by observing properties of the group of text pairs to be searched, or may be given automatically based on machine learning, statistical processing, and the like.

Figure 8:
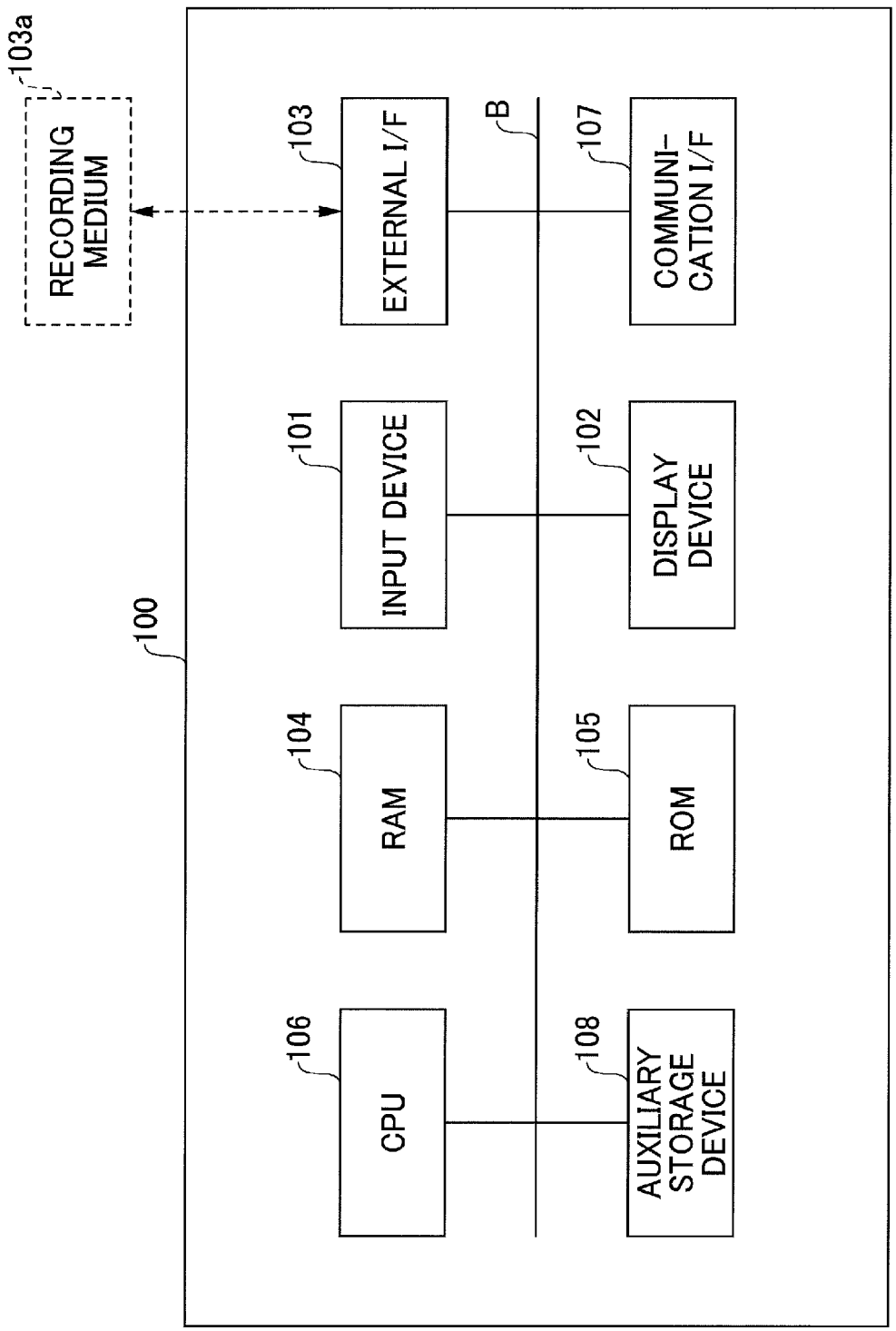
FIG. 8 is a diagram illustrating an example of a hardware configuration of a computer.

Note that the model generation device 10 and the text search device 40 according to the present embodiment are constituted with, for example, a computer 100 as illustrated in FIG. 8. The computer 100 illustrated in FIG. 8 includes an input device 101, a display device 102, an external I/F 103, a RAM (Random Access Memory) 104, a ROM (Read-Only Memory) 105, a CPU (Central Processing Unit) 106, a communication I/F 107, and an auxiliary storage device 108. These hardware units are connected with each other via a bus B. Note that the computer 100 may not include at least one of the input device 101 and the display device 102.

In the present embodiment, the CPU 106 that has read a program stored in the auxiliary storage device 108 such as a hard disk or the ROM 105 to execute the program, causes the above hardware resources and the program to interoperate so as to implement the functions described above. Note that the program may be stored in a recording medium 103*a*, for example, a CD-ROM.

Figure 5:
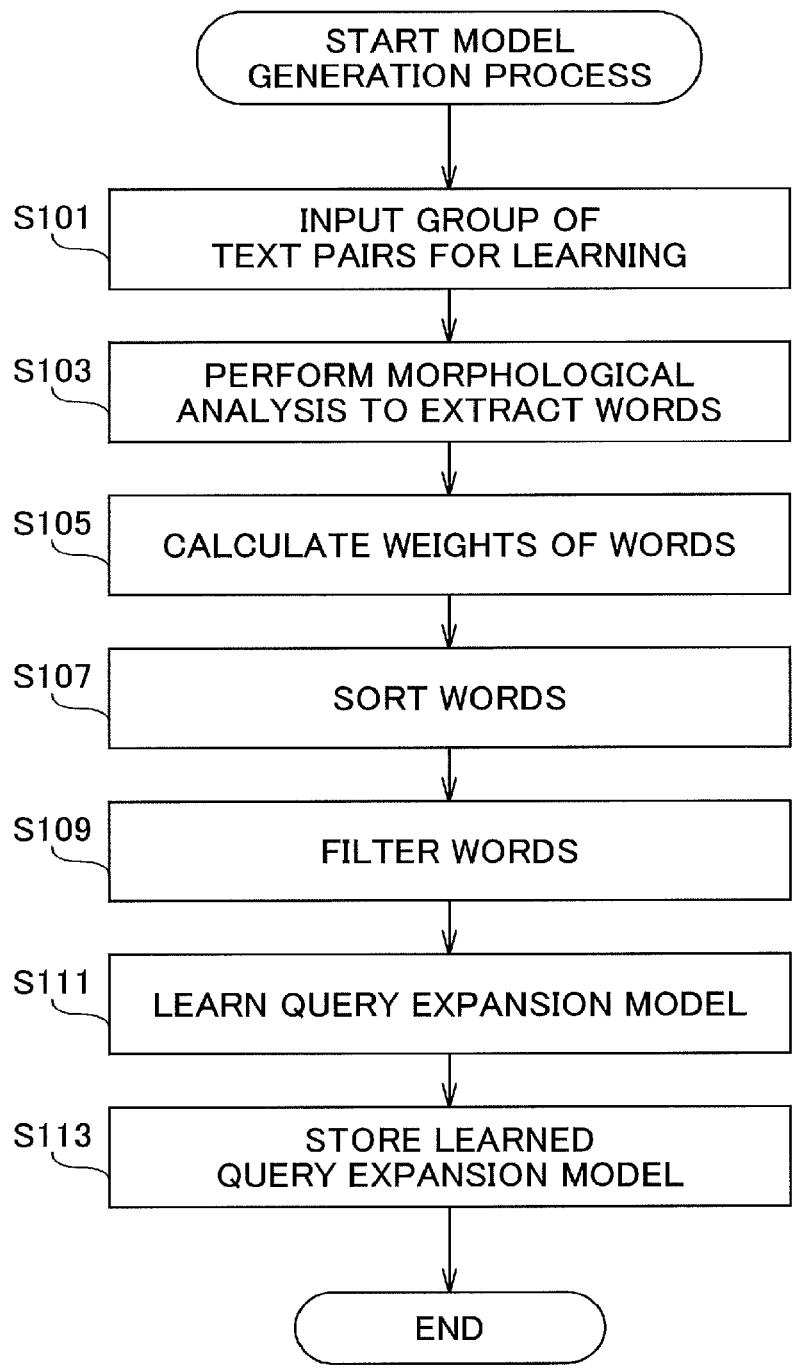
FIG. 5 is a flowchart illustrating a flow of a model generation process executed by a model generation device according to an embodiment.

A flow of a model generation process executed by the model generation device 10 according to the present embodiment will be described with reference to a flowchart illustrated in FIG. 5. In the present embodiment, the model generation process is started at timing when predetermined information for starting the execution of the model generation process is input into the model generation device 10; however, the timing to start the model generation process is not limited as such.

At Step S101, the language analyzer 12 takes as input a group of text pairs for learning.

At Step S103, the language analyzer 12 performs morphological decomposition on each text included in the group of text pairs for input learning, to extract words. Note that at this time, the language analyzer 12 performs stemming of the extracted words.

At Step S105, the word weight calculator 14 calculates the weight for each extracted word.

At Step S107, the word sorter 16*a* sorts the words for which the weights have been calculated, based on the weights.

At Step S109, the word filter 16*b* filters the words by removing words included in a word list of texts to be searched, which are generated by a search index generation process as will be described later, among the sorted words.

At Step S111, the model learning unit 18 learns a query expansion model by using the group of text pairs for learning in which the words have been sorted and the words have been filtered.

At Step S113, the learned query expansion model is stored in the query expansion model storage 20, to end the execution of the program of this model generation process.

Figure 6:
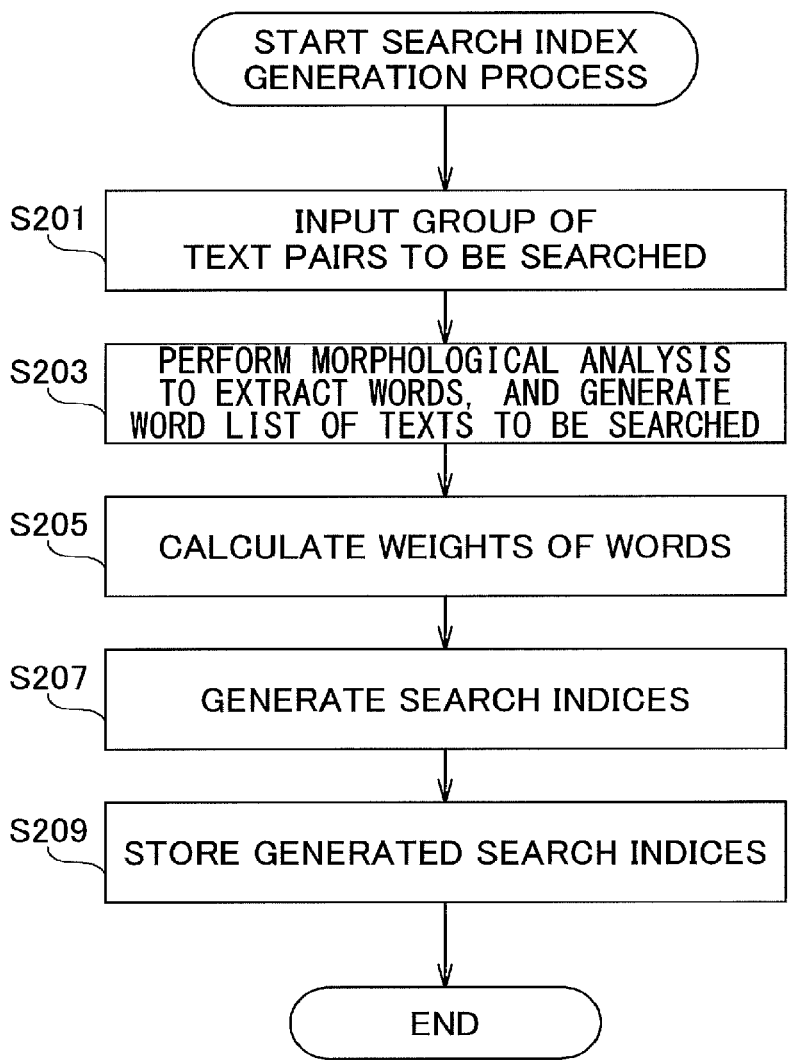
FIG. 6 is a flowchart illustrating a flow of a search index generation process executed by a model generation device according to an embodiment.

Next, a flow of a search index generation process executed by the model generation device 10 according to the present embodiment will be described with reference to a flowchart illustrated in FIG. 6. In the present embodiment, the search index generation process is started at timing when predetermined information for starting the execution of the search index generation process is input into the model generation device 10; however, the timing to start the search index generation process is not limited as such.

At Step S201, the language analyzer 22 takes as input a group of text pairs to be searched.

At Step S203, the language analyzer 22 performs morphological decomposition on texts included in the input group of text pairs to be searched, to extract words. Also, the language analyzer 22 generates a word list of texts to be searched. Note that at this time, the language analyzer 22 performs stemming of the extracted words.

At Step S205, the word weight calculator 24 calculates the weights of the extracted words.

At Step S207, the search index generator 26 generates a first text search index and a second text search index based on the weights of the extracted words.

At Step S209, the search index generator 26 stores the generated first text search index in the first text search index storage 28, and stores the generated second text search index in the second text search index storage 30, to end the execution of the program of this search index generating process.

Figure 7:
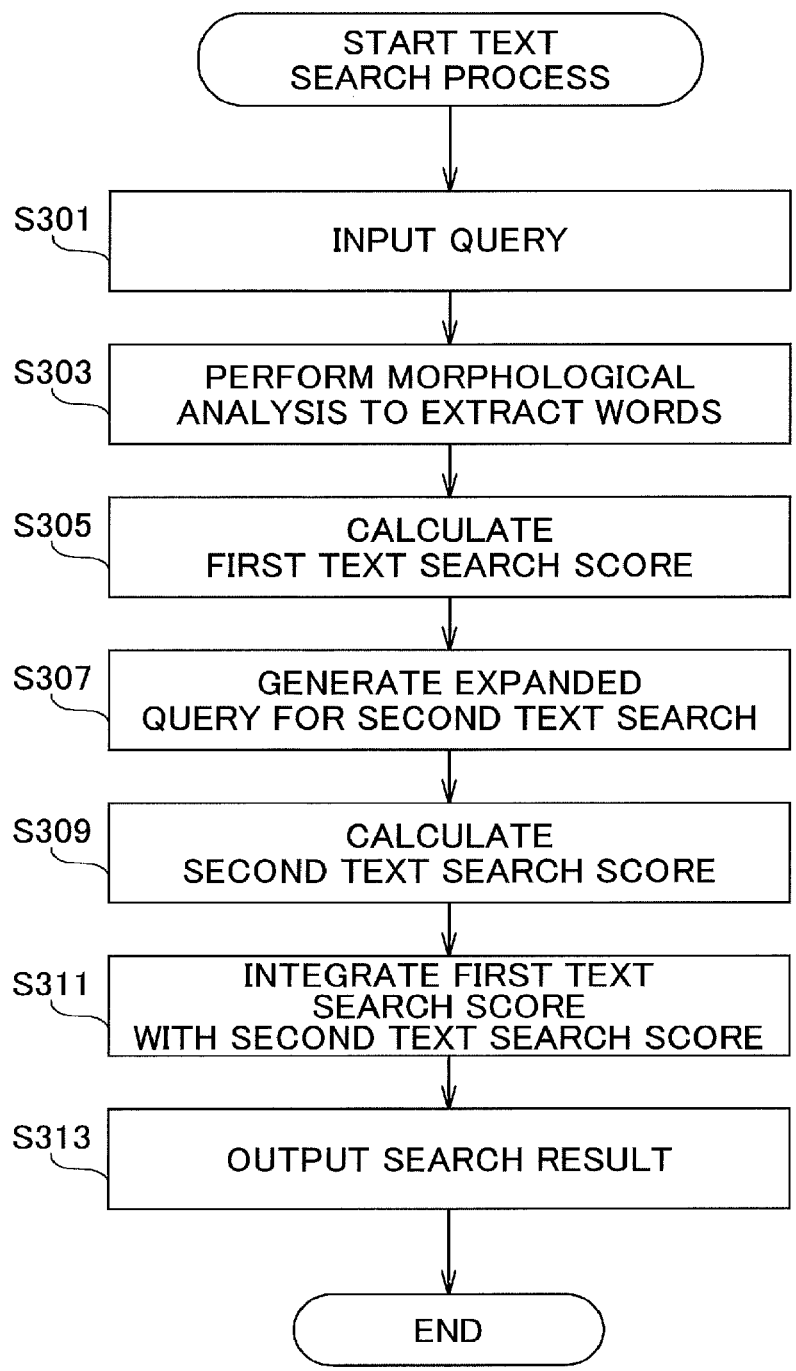
FIG. 7 is a flowchart illustrating a flow of a search process executed by a text search device according to an embodiment.

Next, a flow of a search process executed by the text search device 40 according to the present embodiment will be described with reference to a flowchart illustrated in FIG. 7. In the present embodiment, the search process is started at timing when predetermined information for starting execution of the search process is input into the text search device 40, but the timing to start the search process is not limited as such.

At Step S301, the language analyzer 42 takes as input an input query input by the user.

At Step S303, the language analyzer 42 performs morphological decomposition on the input query to extract words.

At Step S305, the first text search score calculator 44 reads the first text search index from the first text search index storage 28, and based on the input query and the read first text search index, calculates a first text search score.

At Step S307, the expanded query generator 46 reads the query expansion model stored in the query expansion model storage 20, to expand the input query by using the query expansion model, so as to generate an expanded query for the second text search.

At Step S309, the second text search score calculator 48 reads the second text search index from the second text search index storage 30, and based on the expanded query and the read second text search index, calculates a second text search score.

At Step S311, the output unit of integrated search score result 50 integrates, for each pair of first text and second text to be searched, the first text search score and the second text search score to calculate the integrated score.

At Step S313, the output unit of integrated search score result 50 outputs a search result of pairs of the first texts and the second texts to be searched based on the calculated integrated scores, to end the execution of the program of this search process.

In this way, in the present embodiment, taking as input a group of text pairs for learning in which each pair is constituted with a first text for learning and a second text for learning that serves as an answer when a question is made with the first text for learning; and a group of text pairs to be searched in which each pair is constituted with a first text to be searched and a second text to be searched that serves as an answer when a question is made with the first text to be searched, with respect to a text that serves as a query, learning is performed on a query expansion model that generates a text that serves as an expanded query.

Also, in the present embodiment, when searching for a pair of first text and second text that corresponds to the input query in the group of text pairs to be searched in which each pair is constituted with a first text and a second text that serves as an answer when a question is made with the first text, with respect to the input query, an expanded query for searching in the second texts is generated based on the query expansion model learned in advance for generating an expanded query for an input query, and based on the input query and the expanded query, a pair of first text and second text is searched.

Note that in the present embodiment, although operations of the functional elements illustrated in FIG. 1 and FIG. 2 are constructed as a program to be installed on a computer used as the model generation device 10 and the text search device 40 so as to be executed, it is not limited as such; distribution through a network may be possible.

Also, the constructed program may be stored in a portable recording medium such as a hard disk, a CD-ROM, etc., to be installed on or distributed to a computer.

The present application is based on a base application No. 2016-229072 filed on Nov. 25, 2016 in Japan, the entire contents of which are hereby incorporated by reference.

LIST OF REFERENCE SYMBOLS

10 model generation device
12, 22, 42 language analyzer
14, 24 word weight calculator
16 expanded query generator
16a word sorter
16b word filter
18 model learning unit
20 query expansion model storage
26 search index generator
28 first text search index storage
30 second text search index storage
40 text search device
43 text pair searcher
44 first text search score calculator
46 expanded query generator
48 second text search score calculator
50 output unit of integrated search score result

The invention claimed is:
1. A model generation device comprising:
   processing circuitry configured to
      take as input a group of text pairs for learning in which
         each pair is constituted with a first text for learning and a second text for learning that serves as an answer when a question is made with the first text for learning;

receive a word list of texts to be searched that is constituted with words included in a group of text pairs to be searched in which each pair is constituted with a first text to be searched and a second text to be searched that serves as an answer when a question is made with the first text to be searched, so as to remove words not included in the word list of texts to be searched from the group of text pairs for learning, the received word list of texts to be searched is a list of keywords extracted from among a group of text pairs to be searched; and learn a query expansion model that generates a text serving as an expanded query for a text serving as a query, based on the group of text pairs for learning in which the words that are not included in the word list of texts to be searched have been removed by the word filter.

2. A method in a model generation device including a model learning unit, the method comprising:

causing the model learning unit to take as input a group of text pairs for learning in which each pair is constituted with a first text for learning and a second text for learning that serves as an answer when a question is made with the first text for learning;

receiving a word list of texts to be searched that is constituted with words included in a group of text pairs to be searched in which each pair is constituted with a first text to be searched and a second text to be searched that serves as an answer when a question is made with the first text to be searched, so as to remove words not included in the word list of texts to be searched from the group of text pairs for learning, the received word list of texts to be searched is a list of keywords extracted from among a group of text pairs to be searched; and learning a query expansion model that generates a text serving as an expanded query for a text serving as a query, based on the group of text pairs for learning in which the words that are not included in the word list of texts to be searched have been removed by the word filter.

3. A system comprising:

the model generation device according to claim 1; and a text search device that searches for a pair of first text and second text that corresponds to an input query, from among a group of text pairs to be searched in which each pair is constituted with a first text to be searched and a second text to be searched that serves as an answer when a question is made with the first text to be searched, the text search device including processing circuitry configured to generate an expanded query for searching in the second texts based on the query expansion model learned in the model generation device for generating the expanded query with respect to the input query;

search for the pair of first text and second text based on the input query and search for the second text based on the expanded query; and based on the group of text pairs to be searched, generate a search index for the first texts to be searched and a search index for the second texts to be searched.

4. The model generation device according to claim 1, wherein the processing circuitry is configured to perform sorting of words constituting the second texts for learning, in a predetermined order.

5. The model generation device according to claim 1, wherein the text pairs for learning are received from a question answering website on an external network.

6. The model generation device as claimed in claim 1, wherein the group of text pairs to be searched is stored in advance as texts that will actually be searched in response to an input query to a text search device.

7. The method according to claim 2 further comprising:

a text search process in a text search device that includes an expanded query generator and a text pair searcher, to search for a pair of first text and second text that corresponds to an input query, from among a group of text pairs to be searched in which each pair is constituted with a first text to be searched and a second text to be searched that serves as an answer when a question is made with the first text to be searched, the text search method comprising:

causing the expanded query generator to generate an expanded query for searching in the second texts based on the learned query expansion model for generating the expanded query for the input query;

causing the text pair searcher to search for the pair of first text and second text based on the input query and search for the second text based on the expanded query;

based on the group of text pairs to be searched, generating a search index for the first texts to be searched and a search index for the second texts to be searched.

8. A non-transitory computer-readable recording medium having a program stored thereon for causing a computer to execute the method as claimed in claim 2.

9. The system as claimed in claim 3, wherein the processing circuitry of the text search device is further configured to calculate a first text search score for each of the first texts from among the group of text pairs to be searched based on the search index for the first texts and the input query;

calculate a second text search score for each of the second texts from among the group of text pairs to be searched based on the search index for the second texts and the expanded query; and for each pair of the first text and the second text from among the group of text pairs to be searched, integrate the first text search score and the second text search score so as to search for the pair of first text and second text from among the group of text pairs to be searched.

10. The system as claimed in claim 3, wherein the processing circuitry of the text search device is configured to search for the pair of first text and second text by searching for the first text based on the input query and a search index for the first text, and searching for the second text based on the expanded query and a search index for the second text, wherein the search index for the first text and the search index for the second are generated based on a group of text pairs to be searched in which each pair is constituted with a first text to be searched and a second text to be searched that serves as an answer when a question is made with the first text to be searched.

11. The model generation device according to claim 4, wherein the processing circuitry is configured to perform sorting of words constituting the second texts for learning, in a predetermined order.

12. A non-transitory computer-readable recording medium having a program stored thereon for causing a computer to execute the method as claimed in claim 7.

* * * * *